(12) United States Patent
Zamfes

(10) Patent No.: US 6,373,396 B2
(45) Date of Patent: Apr. 16, 2002

(54) METHOD FOR PREDICTING SEISMIC EVENTS

(76) Inventor: Konstandinos S. Zamfes, 1830-10$^{TH}$ Avenue, Calgary, Alberta (CA), T3C 0J8

( * ) Notice: Subject to any disclaimer, the term of this patent is extended or adjusted under 35 U.S.C. 154(b) by 0 days.

(21) Appl. No.: 09/736,313

(22) Filed: Dec. 15, 2000

(30) Foreign Application Priority Data

Dec. 17, 1999 (CA) .............................................. 2292803

(51) Int. Cl.$^7$ .............................................. G08B 21/00
(52) U.S. Cl. ................... 340/690; 340/601; 340/853.9; 367/45
(58) Field of Search ................................ 340/601, 690, 340/853.9, 853.1, 854.1; 367/38, 45, 47, 86; 324/344, 347, 348

(56) References Cited

U.S. PATENT DOCUMENTS

| | | | | |
|---|---|---|---|---|
| 4,359,766 A | * | 11/1982 | Waters et al. | 367/38 |
| 4,964,087 A | * | 10/1990 | Widrow | 367/45 |
| 5,555,220 A | * | 9/1996 | Minto | 340/853.9 |
| 5,784,334 A | * | 7/1998 | Sena et al. | 367/47 |

* cited by examiner

Primary Examiner—Van T. Trieu
(74) Attorney, Agent, or Firm—Sean W. Goodwin

(57) ABSTRACT

A method for predicting seismic events wherein measurable and calculable parameters relating to alterations in the shape of the geoid, such as centripetal and tidal gravitational effects, and gravitational anomalies related to a buildup of energy at any given point in the earth are incorporated with observations from at least two previous, subsequent seismic events, to calculate the energy buildup required to result in a future seismic event.

2 Claims, 6 Drawing Sheets

METHOD FOR PREDICTING SEISMIC EVENTS

FIELD OF THE INVENTION

The present invention relates to methods of predicting the occurrence of seismic events from changes in the earth's equipotential gravitational surface due to polar motion. More particularly, accumulated gravitation shift in geoids between successive polar motions is associated with the accumulation in energy in the earth's crust which can be correlated to seismic events.

BACKGROUND OF THE INVENTION

The majority and most destructive of earthquakes or seismic events are the tectonic quakes which are a result of a sudden release of energy accompanying a shift or dislocation of the earth's crust (shallow) and in the upper mantle (deep).

Shifts in the earth's crust create a potential energy, which is occasionally released in a seismic event. Due to the devastating results of earthquakes, particularly those occurring in populated areas, there have been concerted efforts to predict such events.

There are known areas of frequent seismic activity such as geological locations having faults. Monitoring stations are provided at these locations which, at best, provide warning of an immediately impending event. Monitoring primarily consists of recording geophysical precursors such as P-wave velocity, ground uplift, radon emission, rock electrical resistivity and water level fluctuations. These precursors can have lead times of one day through to several years depending upon the magnitude of the upcoming event.

Some approaches to obtaining more advance notice or prediction of future events includes statistical analysis of the history of earthquakes in a given location so as to determine whether there is a recurrent, or cyclical pattern to the events. These methods can provide a statistical value, for example, a 70% probability of an event happening every 100 years, but still leave an uncertainty of tens of years.

Generally however, there is a need for an earlier warning system and one which can be tied to known and independent factors.

SUMMARY OF THE INVENTION

Using the motion of the earth's poles, a series of successive geoids can be determined. The shift between incremental geoids provides information necessary to determine changes in gravitational anomalies and ultimately the accumulation in energy at a given geological location. Knowing the energy which was released in a previous seismic event, the geoidal shift method of the present invention can be used to monitor and predict a subsequent seismic event.

In a broad form of the invention, a method is provided for predicting seismic events comprising: determining a first geoid surface at first instance in time; determining successive geoid surfaces for successive and incremental instances in time; determining an incremental energy associated with each incremental shift between the successive geoid surfaces; accumulating energy associated with the incremental shifts; and comparing the accumulated energy with a pre-determined energy which has resulted in a seismic event as being indicative of the likelihood of a future seismic event. Preferably, the pre-determined energy for a seismic event is determined by establishing measures of the energy released in a previous seismic event.

DETAILED DESCRIPTION OF THE PREFERRED EMBODIMENT

Figure 1:
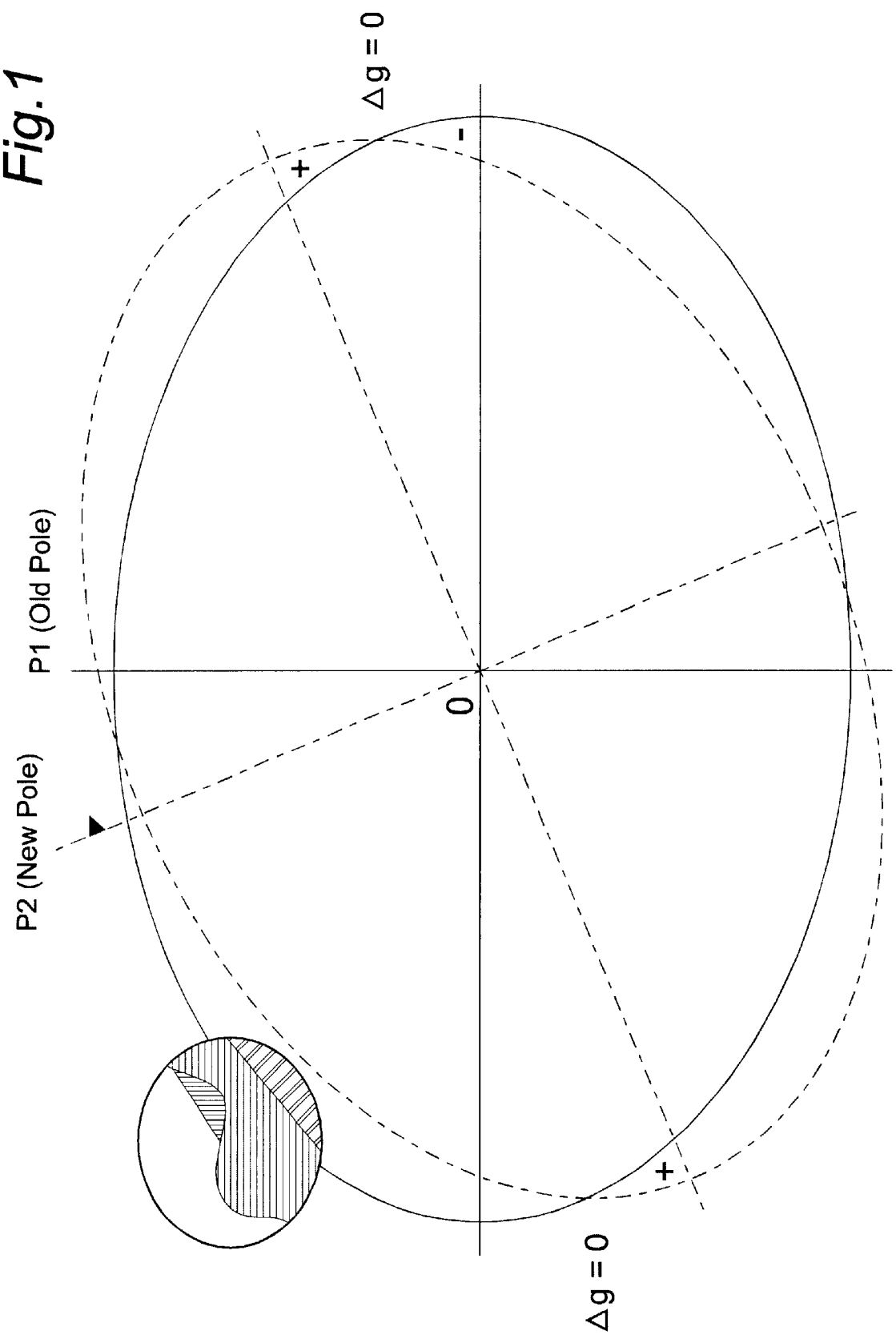
FIG. 1 is a section through the center of the earth which illustrates the effect of polar shift on the corresponding section through the geoid surface.

It is not new that gravitational anomalies affect the shape of the equipotential surface of the earth. This undulating surface is also known as a geoid. Effects which alter the shape of the geoid include the centripetal effect of the earth's rotation (an equatorial bulge) and tidal gravitational effects. The surface undulates due to local gravitational anomalies. While the surface of the ocean provides a good approximation of the geoid, the shape of the geoid can also be calculated over a land mass. These undulations are conventionally determined as departures from the theoretical ellipsoid.

The geoid is associated with the earth's orientation which varies according to an annual elliptical component and a Chandler circular component with a period of about 435 days. The variation is due in part to annual spring melt cycles and tidal effects which exert a torque on the earth. This torque results in precession of the earth's rotational axis. The precession is not a steady process however, there being discontinuities or a lull in the precession each time the tidal mass crosses the equatorial plane. Further, beyond the tidal precession, the earth itself undergoes a free, Eulerian precession, some times called a "free nutation" or the Chandler Wobble.

The earth's orientation or polar motion is monitored. One such monitoring service is the International Earth Rotation Service (IERS) located at the U.S. Naval Observatory. It has been determined that the earth's axis has scribed a conical path of about 23.5° in about 26,000 years.

The major sources of energy for seismic events are the gravitational anomalies. Gravitational anomalies are generated by differences between the gravity equipotential surfaces and the centripetal force of the earth's rotation ($r\omega^2$). This value, of course, varies with latitude from zero at a pole to a maximum at the equator ($r=R \cos \phi$). A shift in axis of the earth's rotation changes the radius of rotation (a vector of rotation force is a component of the gravitation vector).

Variation of sea-level gravity from a theoretical ellipsoid was first set forth, by mid-$18^{th}$ century scientist Alexis Clairaut, as a function of latitude. Adoption of internationally agreed upon constants improved the accuracy of the gravity calculations. Using the expression for gravity, relating mass and distance, increased distance from the earth's center can be added to the calculation. At sea level, the gradient is about −0.3086 milligal per meter of elevation increase. Calculations for such uniform changes in elevation are also known as the Free-Air Anomaly. Pierre Bouguer, again in the mid-18$^{th}$ century, made corrections for actual variations in topography. The resulting correction, about +0.20 milligal per meter of elevation increase, was termed the Bouguer Anomaly. Further, there are well described variations in the crust of the earth, known as the Mohorovicic discontinuities (Moho). Warping of these density interfaces also produce gravity at the earth's surface.

Suffice it to say that the geophysics for determining the geoid surface are known and the detailed mathematics are not reproduced herein.

The equipotential surfaces, or geoids, change continuously over time and certainly as a function of the polar motion. While this is a continuous process, a series of incremental geoid surfaces can be determined from the empirical polar motion and tidal data.

The equipotential surfaces of the gravitation of successive geoids intersect. A gravitational difference or shift $\Delta g$ is represented by the difference between successive geoids. Maximum shifts $\Delta g$ are along the meridian of shift. Minimums or zero $\Delta g$ are found at intersection points of the two equipotential gravitational surfaces.

Adjustments can be made to correct for delay in change of the hard body of the earth to compensate for the already changed rotation vectors.

The shift $\Delta g$ can be expressed as a new surface over the earth. The $\Delta g$ shift represents forces applied to the earth at that point. The surface of the $\Delta g$ shift is calculated in incremental steps. Integration of the $\Delta g$ over time represents the accumulation of energy for the earth at that point.

Further, secondary energy sources include, listed according to magnitude, the moon's tidal wave and the sun's tidal wave. Another source of unbalancing of the polar motion is the movements of the masses on the earth's surface by rivers and oceans.

The movements of the earth surface itself, such as mountain growth, can be a reaction to the gravitational anomalies and have the same sign as the anomaly. The plastic Mohorovicic discontinuity moves to compensate gravity to a stable position or to minimize the anomaly. Additionally, thermal effects of the Earth are as a result of Pressure-Temperature-Melting point drop function as described by Boyle-Mariotte's law.

The major horizontal earth movement energy in the earth is generated by coriolis force and a gravitational sliding or downward motion.

The movement of the earth's masses obeys the law of mechanics of continuum where every material point has its own force field application and is not simply a hard, non-compressible body of flat form. These material point forces are integrated by the volume to obtain a large scale mass movement estimation.

Earthquakes or seismic events are known to be caused by the sudden release of energy within some limited region of the Earth. The energy is largely a result of an accumulation of elastic strain. The release of the elastic strain energy can produce major earthquakes.

By observing the point or region of the earth having two consecutive earthquakes in time, one can determine the energy required to cause the earthquake. This energy represents energy accumulated from factors including those caused by the shift of axis of the earth between said events. From the known energy level, one can predict a similar energy which will trigger or initiate a subsequent seismic event at that same location.

The energy due to polar motion can be estimated by summation of the incremental shift $\Delta g$ at that location. Accordingly, by extrapolating polar motion and resulting shifts in geoid, one can predict the time of the next seismic event and its magnitude.

The theoretical determination of locations and forces involved in earthquakes can be obtained through mathematical modeling. Depending upon the data available and the variables involved, the method varies in complexity.

In one embodiment, a simplified general formula is developed which considers the energy sources, medium properties and geoid configurations. A mathematical formula is derived with its end use applicable for computer-generated modeling.

Of all the possible energy sources, gravity and gravitation is considered to be dominant. Other secondary sources are divided between independent sources such as the gravitational effects of the sun and the moon, solar radiant heat, and dependent sources involving the transformation of energy such as pressure to heat, and others.

The earth's rotation, is considered to be the major variable source and is subject to rapid change. Rotational energy is handled as an equation of the shape of the geoid and the present drift of the geoid's axis of rotation. Between time $t_1$ and time t2, there will be incremental geoid surfaces $g_1$ and $g_2$. The shift $\Delta g$ is the difference therebetween, or $$\Delta g = g_1 - g_2 \tag{1}$$

Figure 4:
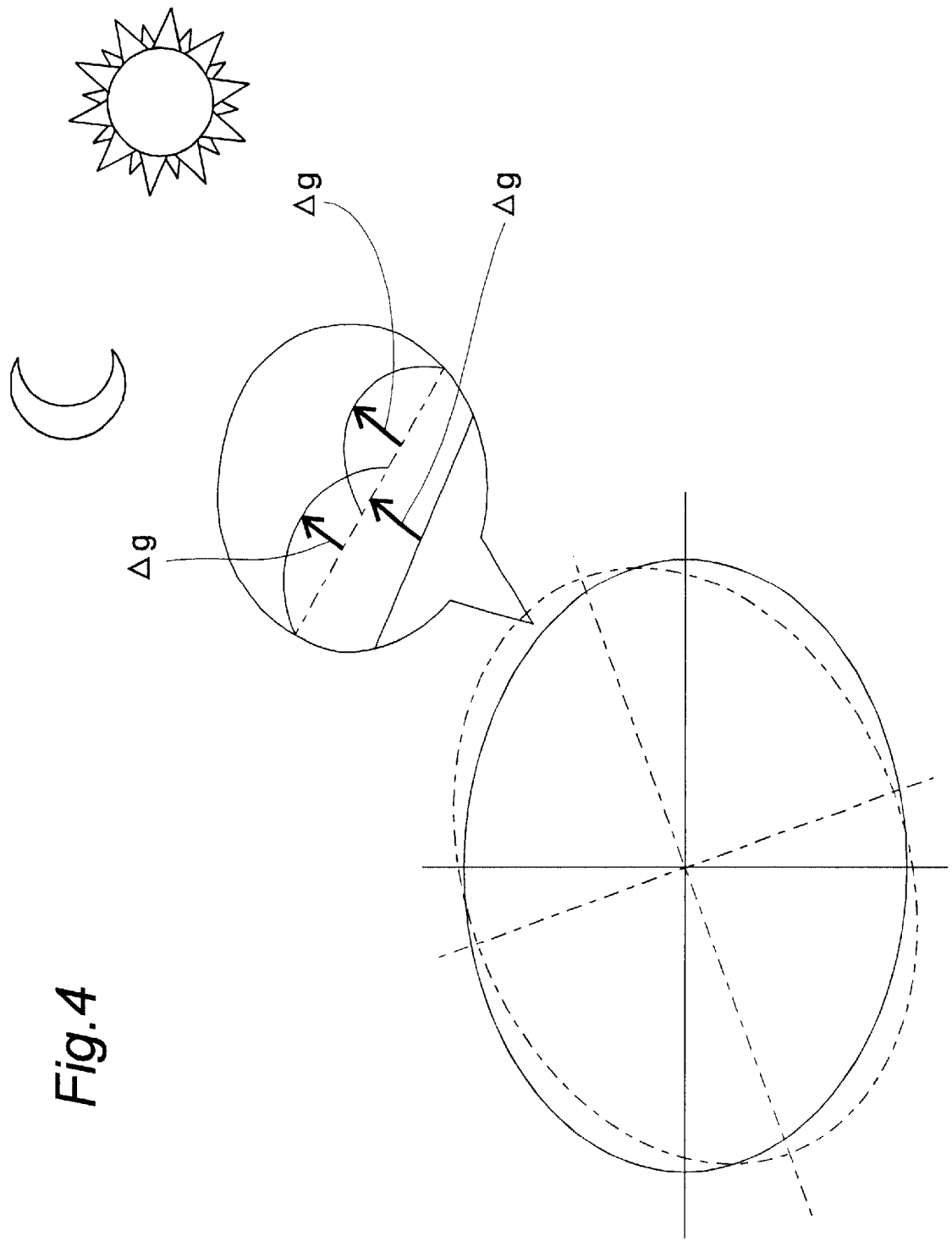
FIG. 4 is a fanciful view to illustrate the tidal gravitational effects of the sun and the moon.

Having reference to FIG. 4, one can see that the geoid rotational surface is defined by equal vectors of rotation. The motion of a material point is the dynamic earth's surface.

The known phenomena of drift of axis of rotation is defined as a change in position of an imaginary axis of symmetry of rotation of the material points where the radius is equal to zero.

During an earthquake, rapid movement of the earth's matter is generated. This displacement or movement $\Delta h$ is working against the plastic properties of the earth at this point—the earthquake epicenter. As a result of a rapid strain release, the geological medium breaks, and the energy released is in a shock-wave form.

The value of the function representing the energy generated is the seismic energy.

$$E_q = KF_k \left( \frac{\Delta h}{\Delta t} \right) \tag{2}$$

where:

$E_q$ is referred to as the energy generated, $F_k$ is the force,

K is the coefficient of the medium property, reflecting the change of potential energy of tension to the dynamic energy of rotation), $\Delta h$—is the displacement or throw of the fault, and $\Delta t$—is the time of duration of the movement or accumulated time in the case of multiple shock events.

From the law of the preservation of energy, the energy accumulated $E_a$ equals the energy released $E_q$.

$$E_a = E_q \quad (3)$$

This condition is satisfied when in the same geographical area, we have repeated earthquakes after known time interval T, where T is greater than zero. (T>>0). Historically, one earthquake occurs at a first instance in time t1 and a successive earthquake occurs at a second instance in time t2.

The total potential energy $E_p$ is that energy accumulated in elapsed time T. After elapsed time T, following the seismic event, the potential energy $E_p$ is substantially zero due to the release during the earthquake. Smaller or minor earthquakes having energy $E_{q0}$, may be a result of residual accumulated energy of $E_a - E_{q0}$. As is later shown, the potential energy is a measurable and calculable element. From the known potential energy, we can find the total stress-force that is required to produce the earthquake.

Geological media properties A, which can be termed media property parameters, can be calculated using conventional methods of determination such as drilling, seismic, gravity, etc. This gives one the ability to adjust the solutions of systems of equations regarding one of the parameters.

Figure 2:
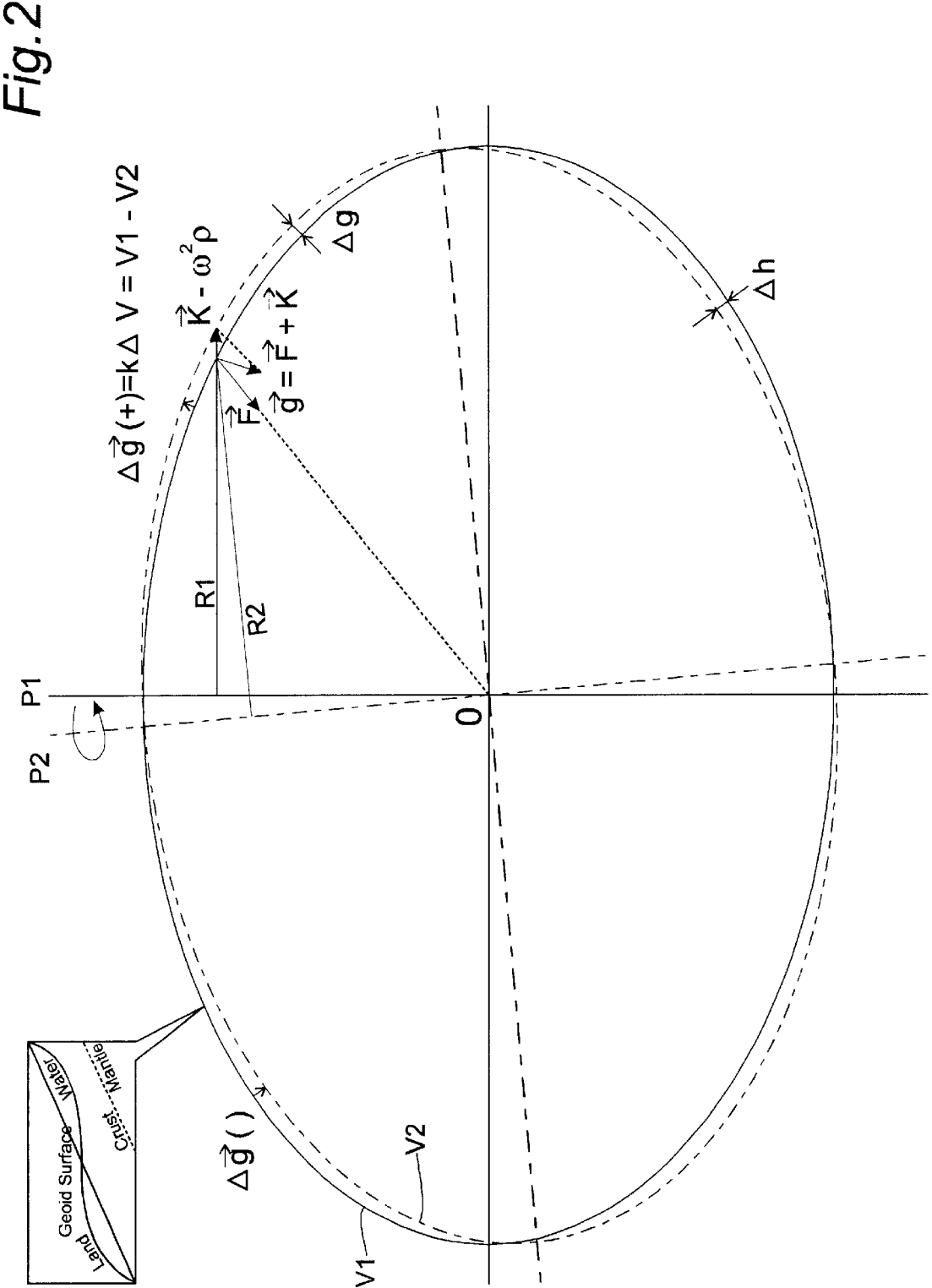
FIG. 2 is a section through the center of the earth which illustrates the effect of polar shift on the forces at a geographical location on the earth.
Figure 3:
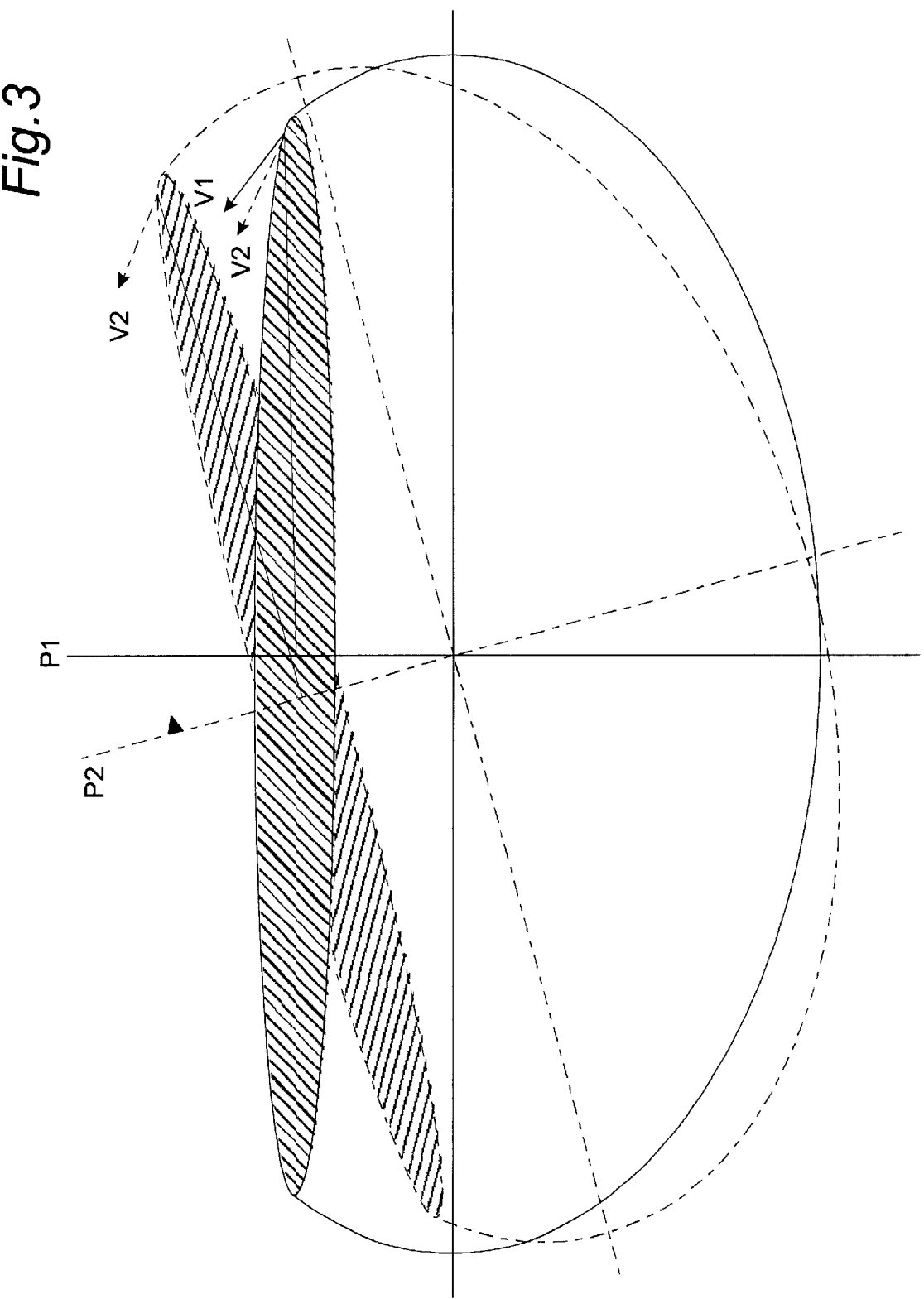
FIG. 3 is a side view of a truncated ellipsoid earth illustrating rotational planes and rotation vectors of a single mass on the surface of a geoid.

One first models the earth's surface as a geoid surface and the geoid as an ellipsoid of revolution. Now, assume that it is a plastically deformable body whose equipotential surfaces are substantially parallel to the geoid's surface. A graph of the model can be simplified to that shown in FIGS. 2 and 3.

When, due to a shift in the axis of rotation, the equipotential surface of the gravitation $V_o$, shifts to a position relative to the gravitated body of earth surface-geoid, the estimate of the value of gravitation changes as $\Delta V$.

$$\Delta V = V_1 - V_2 \quad (4)$$

where $V_i$ is the equipotential gravitation surface of the geoid before the shift of axis, $V'_i$ is the equipotential surface of the geoid after the shift of axis, V is the potential energy accumulated at this point on the geoid, and $\Delta V$ is the difference between the new and the old equipotential levels.

Where the geoidal surfaces at $t_1$ and $t_2$ coincide, there is a minimal change in the trajectory of the earth's crust. Where the geoidal surfaces vary, there is a gravitational anomaly and a shift in the velocity vector or trajectory of the earth. This results in significant forces in the earth's crust.

At each point, there are two forces applied: $\vec{F}$ due to gravity and $\vec{K}$ due to the centripetal force for $\vec{g} = \vec{F} + \vec{K}$. The centripetal force is applied in the plane of rotation and perpendicular to the axis of rotation. Centripetal force can be represented as $K = \omega^2 \rho$ where $\rho$ is the radius of the plane of rotation and $\omega$ is the angular velocity.

In an ideal situation:

$$\Delta V = k \Delta g \quad (5)$$

where $\Delta g$—is the gravitation anomaly generated.

But in practice the solutions are more complicated.

The IERS and others have precisely documented the polar motion for more than 100 years. From this, we can obtain the accumulated value of the total number of events, A, in a given area $$V_a = \sum_{i=1}^{A} \Delta V_i \quad (6)$$

The limit of this value is $$V_l = \lim_{t \to \infty} \sum_{i=1}^{A} \Delta V_i \quad (7)$$

The physical limit is reached when the potential (stress) energy is transformed into the dynamic (strain) energy and results in the earthquake. Therefore these two values are equalized at this time by equation.

$$V_l = f_k\left(\frac{\Delta h}{\Delta t}\right) \quad (8)$$

where $f_k$ is a specific function which can be estimated.

One plots the equipotential surfaces of the $\Delta V$ on a geoid surface. Overlaps indicate multiplication of $\Delta g$ in this point and signal a concentration of energy. As stated, using historical data for the energy and the incident of the last earthquake event, the next may be predicted.

Accordingly, by monitoring the accumulation of potential gravitational energy $E_a$ between two successive earthquakes at a geographical location and between times $t_1$ and $t_n$, and by extrapolating the ongoing accumulation of potential energy to some future polar motion at $t_m$, we can predict the moment when the conditions are satisfied for a similar seismic event.

Figure 5:
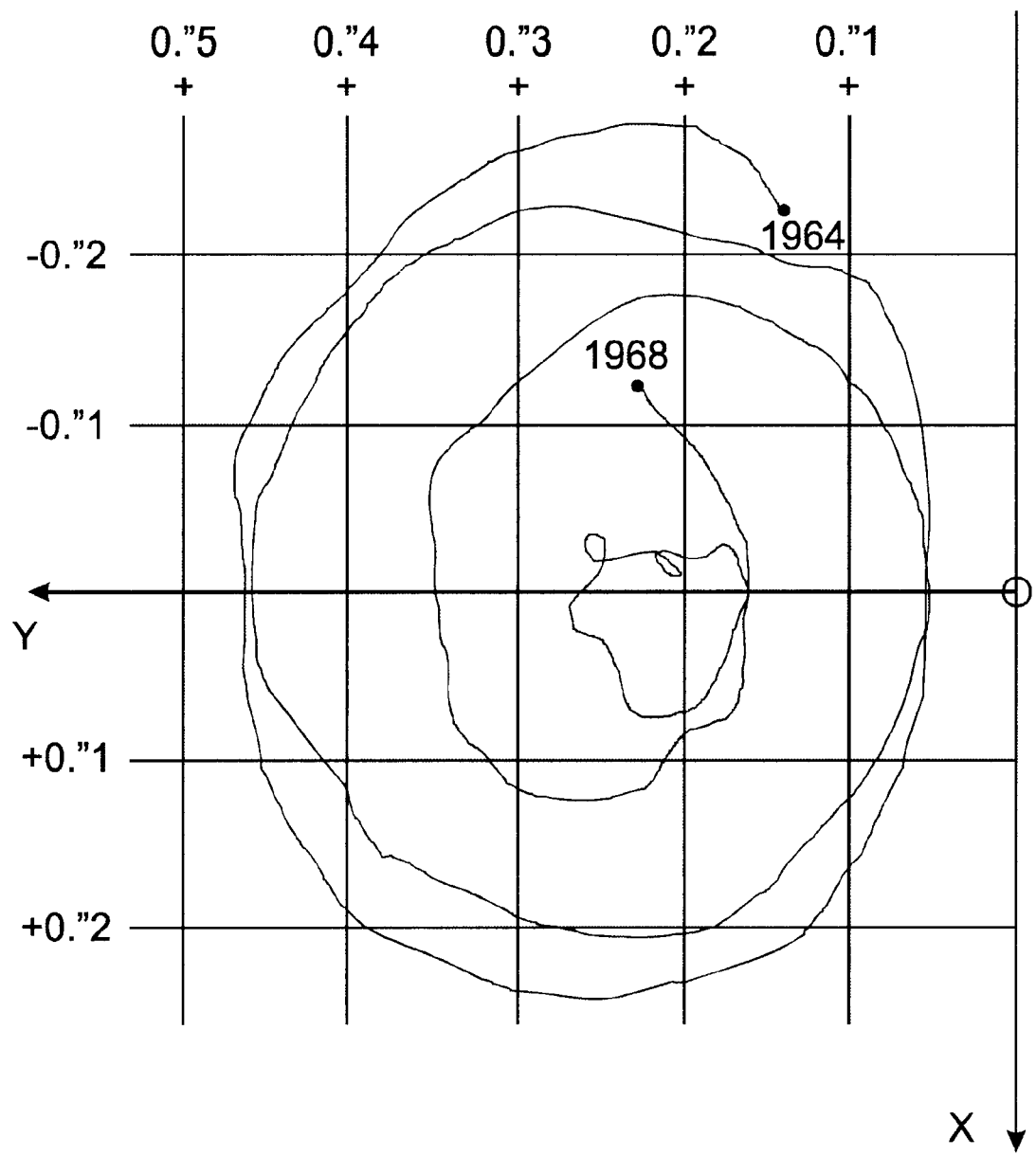
FIG. 5 is a plot of the polar motion of the earth over a selected time period of 1964–1968.

Having reference to FIG. 5, the polar motion for the period of time between 1964 and 1968 are illustrated. It is hypothesized that a beat between the annual and the 14 month cycles results in the occasional collapse or approach of the generally circular polar motion.

Figure 6A:
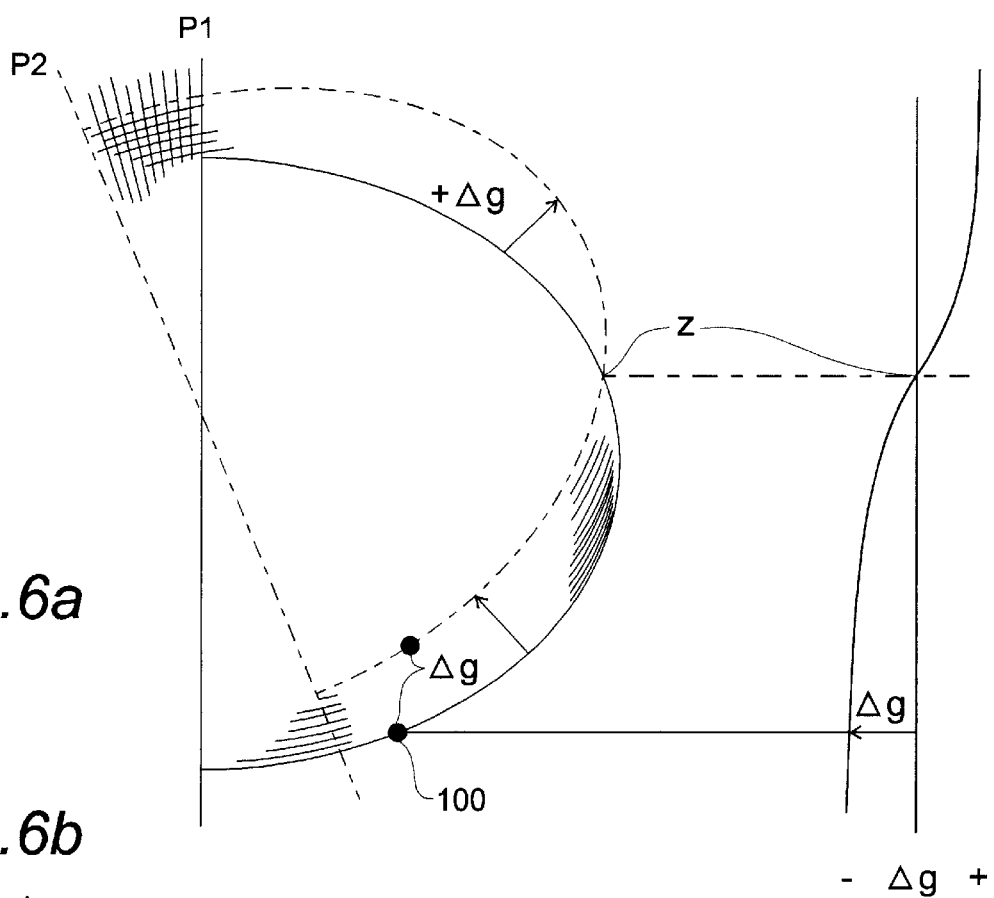
FIG. 6a illustrates two geoids spaced in time with partial indications of the many intermediate incremental geoids which could be calculated therebetween and the magnitude of the change in gravitational effect.
Figure 6B:
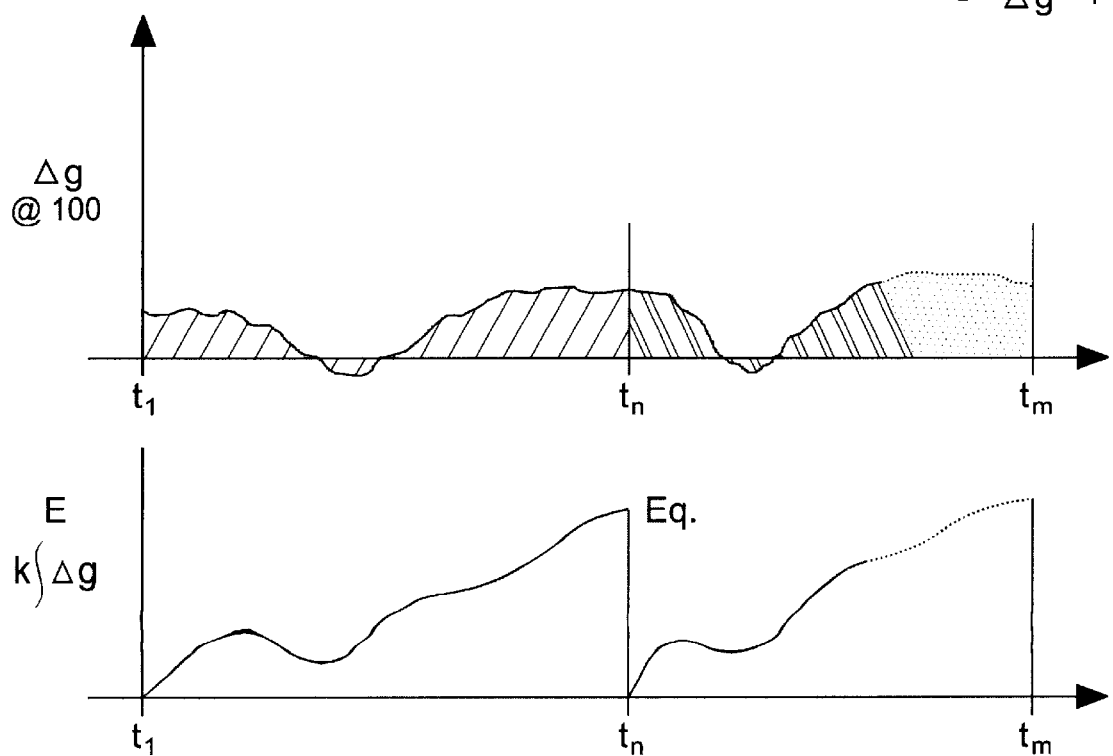
FIG. 6b is a pair of charts which respectively illustrate; a plot of the $\Delta g$ over each time increment between two seismic events at $t_1$ and tn and accumulates over time future event at $t_m$, and a plot of the accumulation of energy between events.

Turning to FIG. 6a, an exaggerated shift of the geoids over time due to polar motion ($P_1 - P_n$) illustrates how the net gravitational effects are increased in some areas and decreased in others. As shown at point Z, the effect is minimal at the intersection of the geoids. In FIG. 6b, the incremental changes in $\Delta g$ for incremental instances in time $t_1 - t_n$ are plotted. At time $t_n$, an earthquake event is indicated. By integrating $\Delta g$ over time between $t_1 - t_n$, and applying the appropriate constants for determining energy, the energy $E_q$ which was necessary to cause the earthquake at that particular locale can be determined.

Having $V_m$ as an anomaly produced from periodic functions such as moon gravity and sun gravity waves $\Delta g_m$, the $V_l$ of Eqn. 8 can be adjusted.

Theoretical calculated values of Moon and Sun tidal gravity change are:

for the moon, $$\Delta g_c = \frac{3}{2} f M_c \frac{\rho}{c_c^3} \left(\frac{c_c}{R_c}\right)^3 \left\{\left(2\cos^2 z_c - \frac{2}{3}\right) + \frac{\rho}{c_c} \frac{c_c}{R_c}(5\cos^3 z_c - 3\cos z_c)\right\} \quad (9)$$

and for the sun, $$\Delta g_{\oplus} = \frac{3}{2} f M_c \frac{\rho}{c_c^3} \frac{M_{\oplus}}{M_c} \frac{\sin^3 \pi_{\oplus}}{\sin^3 \pi_c} \frac{1}{r_{\oplus}^3} \left( 2\cos^2 z_{\oplus} - \frac{2}{3} \right) \quad (10)$$

where $\Delta g, \Delta g$—first differentials on the Earth radius of tidal gravity potential.

$f$—Gravity constant, $M_c$—mass of Moon, $M_{\oplus}$—mass of Sun, $\rho = \alpha(1-e \sin^2 \psi)$—the distance from centre of earth to point of measurement, $c_c$—Average distance from centre of the earth to centre of the moon, $R_c$ the distance from centre of the earth to centre of the Moon on the moment of measurement, $r_{\oplus}$—the radius-vector of the sun.

$\sin \pi_c$, $\sin \pi_{\oplus}$ the equatorial horizontal parallaxes of moon and sun, z—momentary geocentric distance of moon and sun and $$\cos z = \sin \delta \sin \psi + \cos \delta \cos \psi \cos \tau \quad (11)$$

Where $\delta$—Latitude of the Moon or Sun, $\tau$—Hourly angle of the Sun and Moon $\psi$—Geocentric latitude of the point of measurement.

The value of $\Delta g$ is in range of hundreds of mgal compared to the average of the earth's gravity being 980 gal (1 gal=1 cm/s²).

The tidal correction can be made as follows:

$$V_l \le \sum_{i=1}^{A} \Delta V_i + V_m \quad (9)$$

Through satisfying this condition, one is able to determine or predict an earthquake event in time and place. Past experiments have shown good correlation between seismic events and moon tide peaks.

There is a geological part of the methodology that is similarly determinable applying similar techniques. The vector calculus equations that actually define the gravity, gravitation and the elastic properties of the Earthquake, vector movements of a solid point of the geoid and centripetal potential belong to the field of vector calculus and the theory of the earth topography which are known to those of ordinary skill in the art.

The embodiments of the invention for which and exclusive property or privilege are claimed are defined as follows:

1. A method for predicting seismic events comprising:

(a) determining a first geoid surface at first instance in time;

(b) determining successive geoid surfaces for successive and incremental instances in time;

(c) determining an incremental energy associated with each incremental shift between the successive geoid surfaces;

(d) accumulating energy associated with the incremental shifts; and (e) comparing the accumulated energy with a pre-determined energy which has resulted in a seismic event as being indicative of the likelihood of a future seismic event.

2. The method of claim 1 wherein the pre-determined energy for a seismic event is determined by:

(a) identifying a first instance in time when a seismic event occurred at the geographical location;

(b) identifying a second instance in time when a second successive seismic event occurred at the geographical location; and (c) establishing measures of the energy released in the second successive seismic event.

* * * * *